TEMPERATURE COMPENSATION CIRCUITS

Filed Sept. 27, 1968

Inventor
Lionel Raymond Frank Thompson
By
Dowell & Dowell
Attorneys

United States Patent Office 3,519,826
Patented July 7, 1970

3,519,826

TEMPERATURE COMPENSATION CIRCUITS

Lionel Raymond Frank Thompson, Hatfield, England, assignor to Hawker Siddeley Dynamics Limited, Hatfield, England, a British company Filed Sept. 27, 1968, Ser. No. 763,335
Claims priority, application Great Britain, Sept. 29, 1967, 44,499/67
Int. Cl. G01t 1/26
U.S. Cl. 250—83.3 2 Claims

ABSTRACT OF THE DISCLOSURE

In a system incorporating an infrared detection cell and amplifying circuitry for the cell signal, instead of being mounted in a constant temperature environment as hitherto, the cell is permitted to fluctuate in temperature along with ambient temperature, and temperature compensation is provided in the circuitry. The amplifying circuitry has three successive amplifier stages, and two temperature-compensating networks are connected intermediate the first and second, and intermediate the second and third stages, respectively. These temperature-compensating networks include thermistors and associated resistors. The infrared detection cell is mounted on top of a thermally-conductive copper block and the two temperature-compensating thermistors are mounted on either side of this same block. The remaining resistors in the temperature-compensating networks are selected so as to give a law of gain change with temperature variation such as to compensate closely for the variation in response of the cell with temperature.

This invention relates to temperature compensation in electrical circuits incorporating infrared detection cells.

Infra red sensitive cells are made use of in various circumstances for the detection of hot bodies, one example being the monitoring of axle boxes on passing railway trains so as to discover any box that is overheated. One problem involved in this is that the response of such cells is critical in regard to ambient temperature. In order to overcome the effects of changes in ambient temperature one may install the cell in a chamber which is heated to a thermostatically-controlled temperature in the region of or above the highest ambient temperature likely to be experienced. This approach, however, has the disadvantage that, since the signal to noise ratio obtained is better when the cell is colder, the application of artificial heat means that the cell is working for a large part of the time at a poorer signal to noise ratio than it need. It is therefore an object of this invention to provide an improved technique of temperature compensation.

According to the present invention, temperature-sensitive electrical impedance elements are mounted so as to partake of the same temperature environment as the infrared cell, and are connected into multi-stage amplifying circuitry for the cell signal output in an arrangement such that the amplifier gain is adjusted with temperature to compensate for ambient-temperture-dependent changes in the cell response. In the preferred form, the temperature-impedance elements are thermistors which are mounted on a block of high thermal conductivity material, and the infrared sensitive cell is also mounted on the same block.

Figure 1:
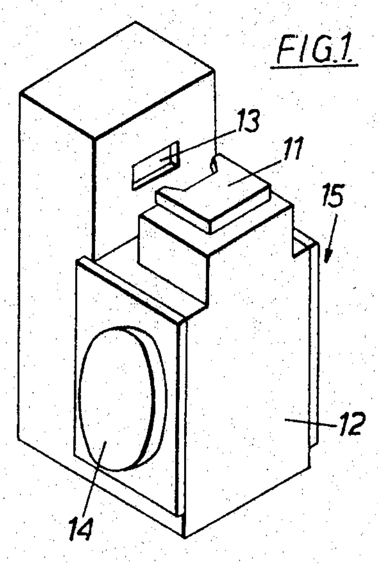
Figure 2:
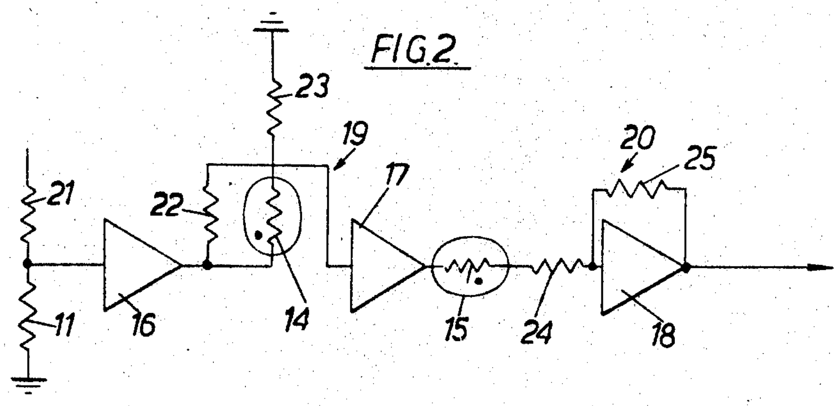

One embodiment of the invention will now be described by way of example with reference to the accompanying drawings, in which:

FIG. 1 is a pictorial diagram of the disposition of the essential elements of an arrangement according to the invention, FIG. 2 is an electrical diagram of the arrangement.

FIG. 1 shows the mounting of an infrared sensitive cell intended for use in equipment for the detection of overheated axle boxes. The cell 11 is set on top of a comparatively large copper block 12 in optical alignment with an optical stop 13. Clamped against opposite sides of the block 12, in good thermal contact therewith, are two thermistors 14, 15. The two thermistors are therefore always at substantially the same temperature as the cell 11.

FIG. 2 shows the circuit diagram. The cell 11, which constitutes a photo resistor, is connected in series with a load resistor 21 between a source of polarising voltage and ground. The cell signal is taken from the junction point of the resistors 11, 21 and applied to the input of a first amplifier 16, which is followed by second and third amplifiers 17, 18. Between the first and second amplifier and between the second and third amplifiers there are two temperature compensating networks 19, 20. The network 19 between the first and second amplifiers comprises the thermistor 14 having its first terminal connected to the output of the amplifier 16 and its second terminal connected to the input of the amplifier 17. A resistor 22 is connected in parallel with the thermistor 14, and a further resistor 23 is connected between the second terminal of the thermistor and ground. The network 20 between the second and third amplifiers comprises the thermistors 15 connected on the one hand to the output of the amplifier 17 and on the other hand to the input of the amplifier 18 through a resistor 24. The third amplifier 18 also has a feedback resistor 25.

It will be observed that the degree of attenuation of the signal applied to the second amplifier 17 by the first amplifier 16 is dependent on the temperature-dependent ohmic value of the thermistor 14, and likewise the degree of attenuation of the signal from the second amplifier 17 to the third amplifier 18 is dependent on the ohmic value of the thermistor 15. The overall gain of the circuitry is consequently variable and determined by the temperature to which the thermistors are subjected, which is the same as the temperature of the infrared cell 11 by virtue of the common mounting on the copper block 12.

By appropriate choice of the circuit values in the networks 19, 20 one may obtain a law of gain change with temperature variation such as to compensate quite closely for the variation in response of the cell 11 with temperature. That is to say, the resistors 22, 23 in the network 19, and the resistors 24, 25 in the network 20, are shaping resistors for adjusting the gain variation characteristic to match the temperature characteristic of the infra red cell. In this way effective temperature compensation is achieved in a simple inexpensive manner.

What is claimed is:

1. An infrared detection electrical circuit arrangement with temperature compensation, comprising a block of high thermal conductivity material, an infrared sensitive detection cell mounted on said block, multi-stage amplifier circuitry receiving and amplifying the cell signal output, and temperature-compensating networks connected between successive stages of said multi-stage amplifier circuitry, which temperature-compensating networks include temperature-sensitive impedance elements mounted on said block and resistors selected to adjust the circuit gain variation characteristic to match the temperature characteristics of the associated temperature-sensitive impedance elements.

2. An arrangement according to claim 1, wherein the multi-stage amplifier circuitry comprises three amplifier stages in series, with two temperature-compensating networks connected, respectively, between the first and second and the second and third amplifier stages, each of the two temperature-compensating networks including a respective thermistor as its temperature-sensitive impedance element, the two thermistors being mounted on opposite sides of said block.

References Cited

UNITED STATES PATENTS

| | | | |
|---|---|---|---|
| 3,234,479 | 2/1966 | Shimada et al. | 330—23 X |
| 3,244,875 | 4/1966 | Crane et al. | 73—355 X |
| 3,415,994 | 12/1968 | Fitti | 250—83.3 |

WALTER STOLWEIN, Primary Examiner

D. L. WILLIS, Assistant Examiner

U.S. Cl. X.R.

330—143